United States Patent
Hara et al.

(10) Patent No.: US 8,400,886 B2
(45) Date of Patent: Mar. 19, 2013

(54) THERMALLY-ASSISTED MAGNETIC RECORDING HEAD, HEAD GIMBAL ASSEMBLY AND MAGNETIC RECORDING DEVICE

(75) Inventors: Shinji Hara, Tokyo (JP); Tsutomu Chou, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 53 days.

(21) Appl. No.: 13/204,026

(22) Filed: Aug. 5, 2011

(65) Prior Publication Data

US 2013/0033972 A1 Feb. 7, 2013

(51) Int. Cl.
*G11B 11/00* (2006.01)

(52) U.S. Cl. ............... 369/13.33; 369/13.13; 369/112.27

(58) Field of Classification Search ................ 369/13.33, 369/13.32, 13.24, 13.14, 13.03, 13.02, 13.12, 369/13.13, 13.01, 13.35, 13.17, 112.27, 112.09, 369/112.01; 360/59, 125.31, 125.74, 125.75
See application file for complete search history.

(56) References Cited

U.S. PATENT DOCUMENTS

| | | | | |
|---|---|---|---|---|
| 7,911,882 B2* | 3/2011 | Shimazawa et al. | ....... | 369/13.33 |
| 8,000,178 B2* | 8/2011 | Shimazawa et al. | ....... | 369/13.33 |
| 8,098,547 B2* | 1/2012 | Komura et al. | ............ | 369/13.33 |
| 8,264,919 B2* | 9/2012 | Komura et al. | ............ | 369/13.33 |
| 2010/0103553 A1 | 4/2010 | Shimazawa et al. | | |

FOREIGN PATENT DOCUMENTS

| | | |
|---|---|---|
| JP | H10-162444 A | 6/1998 |
| JP | 2001-255254 A | 9/2001 |
| JP | 2004-151046 A | 5/2004 |
| JP | 2004-158067 A | 6/2004 |
| JP | 2010-049781 A | 3/2010 |
| JP | 2010-080044 A | 4/2010 |

* cited by examiner

*Primary Examiner* — Ali Neyzari
(74) *Attorney, Agent, or Firm* — Posz Law Group, PLC

(57) ABSTRACT

A thermally-assisted magnetic recording head that includes a pole that generates a writing magnetic field, a waveguide through which light propagates, a plasmon generator that surface-evanescent-couples with the light propagating through the waveguide, wherein the plasmon generator includes a portion where a cross-sectional area gradually decreases as going toward a depth side from an air bearing surface when being observed from a cross section parallel to the air bearing surface. The volume of the plasmon generator can be decreased and an exposed area of a front surface on the air bearing surface can be increased. When a thermal expansion from the temperature increase occurs in the plasmon generator, a rate that the plasmon generator projects from the air bearing surface is suppressed to extremely low levels. Accordingly, a chronological degradation of output can be suppressed and thermally-assisted recording having a high and long-term reliability is achieved.

12 Claims, 13 Drawing Sheets

THERMALLY-ASSISTED MAGNETIC RECORDING HEAD, HEAD GIMBAL ASSEMBLY AND MAGNETIC RECORDING DEVICE

BACKGROUND

1. Field of the Invention

The present invention relates to a head used for thermally-assisted magnetic recording that irradiates near-field light to a magnetic recording medium and records data by decreasing an anisotropic magnetic field of the magnetic recording medium, and to a head gimbal assembly and a magnetic recording device using the head.

2. Description of the Prior Art

In the field of magnetic recording using a head and a medium, further performance improvements of thin film magnetic heads and magnetic recording media have been demanded in conjunction with a growth of high recording density of magnetic disk devices. For the thin film magnetic heads, composite type thin film magnetic heads with a configuration in which a magnetoresistive (MR) element for reading and an electromagnetic conversion element for writing are laminated are currently widely used.

The magnetic recording medium is a discontinuous medium in which magnetic microparticles gather and each of the magnetic microparticles has a single magnetic domain structure. In this magnetic recording medium, a single recording bit is configured with a plurality of magnetic microparticles. Therefore, in order to increase recording density, asperities at a border between adjacent recording bits need to be reduced by decreasing the size of the magnetic microparticles. However, reducing the magnetic microparticles in size leads to a decrease in the volume of the magnetic microparticles, resulting in a decrease in the thermal stability of magnetizations in the magnetic microparticles.

As a countermeasure against this problem, increasing magnetic anisotropy energy Ku of the magnetic microparticles may be considered; however, the increase in Ku causes an increase in an anisotropic magnetic field (coercive force) of the magnetic recording medium. On the other hand, the upper limit of the writing magnetic field strength of the thin film magnetic head is substantially determined by a saturation magnetic flux density of a soft magnetic material configuring a magnetic core in the head. As a result, when the anisotropy magnetic field of the magnetic recording medium exceeds an acceptable value determined from the upper value of the writing magnetic field strength, it becomes impossible to write. Currently, as a method to solve such a problem of the thermal stability, a so-called thermally-assisted magnetic recording method has been proposed in which, while a magnetic recording medium formed of a magnetic material with large Ku is used, the magnetic recording medium is heated immediately before the application of the writing magnetic field to reduce the anisotropic magnetic field and thereby the writing is performed.

For the thermally-assisted magnetic recording method, a method using laser light is common as a method for heating the magnetic recording medium. More specifically, there are a method (direct heating) in which laser light is guided to the vicinity of a recording portion of a magnetic recording medium by an optical waveguide or the like to heat the magnetic recording medium and another method (near-field light heating) in which laser light is converted to near-field light to heat the medium.

As an example of the direct heating, JP Patent Laid-Open H10-162444 discloses a technology that records extremely minute magnetic domain signals to an optical magnetic disk using a solid immersion lens.

Also as examples of the near-field light heating, JP Patent Laid-Open 2001-255254 discloses an optical recording technology using a near-field light probe configured with a metal scatterer in the shape of circular cone, triangle or the like formed on a substrate and a film such as a dielectric body formed in the vicinity of the scatterer. And also, JP Patent Laid-Open 2004-158067 discloses a technology in which a scatterer configuring a near-field light probe is disposed in a manner of contacting a main pole of a single pole writing head for perpendicular magnetic recording such that the scatterer is disposed perpendicular to the recording medium.

Note, near-field light is one type of a so-called electromagnetic field that is formed in the vicinity of substances, and has a property that can ignore a diffraction limitation due to a wavelength of light. By irradiating light having identical wavelength to a minute structure body, it becomes possible to form a near-field depending on the scale of a minute structure body and even to focus light to a minimum region of several tens of nanometers.

As a specific method for generating near-field light, a method using a so-called plasmon antenna, which is a near-field light probe formed of a metal piece that generates near-field light from plasmon excited by light, is generally known.

In the above-described method using the plasmon antenna, near-field light is generated by direct irradiation of light to the plasmon antenna (for example, JP Patent Laid-Open No. 2010-80044, JP Patent Laid-Open No. 2010-49781, or the like); however, the conversion efficiency from the irradiated light to the near-field light is low with this method. In other words, most of the energy of the light irradiated to the plasmon antenna reflects off a surface of the plasmon antenna or is converted to thermal energy. Since the size of the plasmon antenna is set to the wavelength of the light or less, the volume of the plasmon antenna is small.

As a result, a temperature increase due to heat generation of the plasmon antenna becomes extremely large, the plasmon antenna may be easily diffused/melted, and a negative effect that the plasmon antenna cannot play its role may occur.

As disclosed in, for example, US 2010/0103553, a technology is proposed in which light propagating through a waveguide is coupled with a near-field light generating portion (plasmon generator: PG) with a buffer layer therebetween in a surface plasmon polariton mode to excite surface plasmon on the plasmon generator without directly irradiating light to the plasmon antenna.

In the proposal, the plasmon generator includes a near-field light generator that is positioned on a surface opposing the magnetic recording medium and that generates the near-field light. In the technology, when the light propagating through the waveguide totally reflects off an interface between the waveguide and the buffer layer, evanescent light penetrating into the buffer layer is generated, the evanescent light couples to collective oscillation of charge, which is surface plasmon, on the plasmon generator, and the surface plasmon is excited on the plasmon generator. The surface plasmon excited on the plasmon generator propagates to a near-field light generator through a propagation part (such as an edge), and thereby near-field light is generated from the near-field light generator positioned on the surface opposing the magnetic recording medium.

According to this technology, since the light propagating through the waveguide is not directly irradiated to the plasmon generator, it is possible to prevent an excessive temperature increase. This type of element is occasionally referred to as a surface evanescent light coupling type near-field light generating element.

Meanwhile, in the thermally-assisted recording element, temperature increases not only in the magnetic recording medium, which is a target to heat, but also in the thermally-assisted recording element occur. As a result, selective thermal expansion occurs in the vicinity of the plasmon generator. Specifically, metals such as, for example, Au, Ag, Cu or the like, which are used as materials for a plasmon generator with high efficiency, have a higher thermal expansion rate compared to surrounding materials for a dielectric body that is used as a cladding materials and a core material, a pole, or the like.

Furthermore, the metals such as Au, Ag, Cu or the like, which are used as the materials for the plasmon generator, have a lower hardness compared to the materials positioned in its vicinity. Moreover, the plasmon generator is configured such that locally excessive heating can be suppressed; however, its volume is larger compared to the volume of a conventional plasmon antenna. Therefore, it can be said that, with the configuration, effects due to the volume expansion of the plasmon generator are more likely to occur when the plasmon generator is entirely heated.

In this way, with the plasmon generator that is formed of Au, Ag, Cu or the like having a property of a high thermal expansion rate and a low hardness and that occupies a predetermined volume, a problem that the plasmon generator itself projects from an ABS, which is a so-called air bearing surface, may occur due to the temperature increase. The plasmon generator that is projected from the ABS, which is the so-called air bearing surface, as described above may collide with the magnetic recording medium, so that a variety of negative effects such as a loss of the plasmon generator, a decrease in the flying stability or the like may occur.

The present invention was invented based on the above-described condition. The objective of the present invention is to provide a thermally-assisted magnetic recording head that can suppress a chronological degradation of output to achieve thermally-assisted recording having a high and long-term reliability by suppressing the projecting of the plasmon generator due to the temperature increase from the ABS, which is the air bearing surface, and to provide a head gimbal assembly and a magnetic recording device that are configured with the above-described head.

SUMMARY

In order to solve the drawback, the present invention is a thermally-assisted magnetic recording head including a pole that generates a writing magnetic field from an end surface forming a portion of an air bearing surface opposing a magnetic recording medium, a waveguide through which light propagates, and a plasmon generator that surface-evanescent-couples with the light propagating through the waveguide, wherein the plasmon generator includes a transmit part for transmitting plasmon generated on a surface to the air bearing surface as being closely-aligned with the waveguide and generates near-field light from a near-field light generating end surface forming a portion of the air bearing surface, and the plasmon generator is configured with a portion where a cross-sectional area gradually decreases as going toward a depth side from the air bearing surface when being observed from a cross section parallel to the air bearing surface.

In a preferred embodiment of the thermally-assisted magnetic recording head of the invention, the plasmon generator is configured including Au, Ag or Cu.

In a preferred embodiment of the thermally-assisted magnetic recording head of the invention, the plasmon generator is configured with a propagation edge that functions as the transmit part or a convex part that functions as the transmit part.

In a preferred embodiment of the thermally-assisted magnetic recording head of the invention, the plasmon generator is configured with a tabular part and a convex part, the part projecting from the tabular part toward a side of the waveguide, that functions as the transmit part.

In a preferred embodiment of the thermally-assisted magnetic recording head of the invention, the tabular part is configured with a portion where a cross-sectional area gradually decreases as going from the air bearing surface toward the depth side when being observed from a cross section parallel to the air bearing surface.

In a preferred embodiment of the thermally-assisted magnetic recording head of the invention, when the plasmon generator is formed of a material M and is used in a state where a temperature increase thereof is Tup, the portion where the cross-sectional area gradually decreases as going from the air bearing surface to the depth side is configured to obtain an opening ratio $\delta o$ that is an effective opening ratio $\delta ef$ or greater, which are defined by following expressions;

the opening ratio $\delta o$ is defined as $\delta o = $(depth length $Lb$ of plasmon generator×area $S_{ABS}$ of air bearing surface of plasmon generator)/(volume $V$ of plasmon generator), and the effective opening ratio $\delta ef$ is defined as $\delta ef = 1.3 \times [(1+\text{linear expansion ratio of material M} \times \text{element increased temperature } Tup)^3 - 1]/[(1+\text{linear expansion ratio of Au} \times 200)^3 - 1]$.

In a preferred embodiment of the thermally-assisted magnetic recording head of the invention, the transmit part is configured to be disposed continuously along a propagation direction of light from the near-field light generating end surface to the waveguide.

In a preferred embodiment of the thermally-assisted magnetic recording head of the invention, a projection height of the convex part is configured to be 20-30 nm.

In a preferred embodiment of the thermally-assisted magnetic recording head of the invention, a length of the plasmon generator along the propagation direction of light through the waveguide is configured to be 0.6-1.8 µm.

In a preferred embodiment of the thermally-assisted magnetic recording head of the invention, a width of the pole, from the perspective of the air bearing surface, in a direction substantially orthogonal to a moving direction of a magnetic recording medium is configured to be 0.2-0.3 µm.

A head gimbal assembly on the present invention is configured with a thermally-assisted magnetic recording head according to claim 1 and a suspension supporting the thermally-assisted magnetic recording head.

A magnetic recording device of the present invention is configured with a magnetic recording medium, the thermally-assisted magnetic recording head according to claim 1, and a positioning device that positions the thermally-assisted magnetic recording head with respect to the magnetic recording medium as well as supports the thermally-assisted magnetic recording head.

DETAILED DESCRIPTION

Prior to explaining embodiments of the present invention, terminologies used in the present specification are defined. In a lamination structure or an element structure formed on an element formation surface of a slider substrate of a thermally-assisted magnetic recording head, from a perspective of a layer or element to be a standard, a substrate side is referred to as "lower (below)," and an opposite side is referred to as "upper (above)." In addition, in the embodiments of the thermally-assisted magnetic recording head, "X, Y and Z directions" are defined in some of the drawings as necessary. Here, the Z axis direction corresponds to the above-described "upper and lower directions", and +Z side corresponds to a trailing side, or a depth direction. Moreover, some portions of the drawings are illustrated changing their scale in the upper and lower directions and the left and right directions to illustrate visibly so that the scale may be different from an actual scale.

Similarly, in descriptions of the thermally-assisted magnetic recording head, "side surfaces" of a waveguide disposed in the thermally-assisted magnetic recording head are end surfaces that surround the waveguide other than end surfaces perpendicular to a propagation direction (−X direction) of light propagating through the waveguide. Therefore, both an "upper surface" and a "lower surface" of the waveguide in the descriptions of the thermally-assisted magnetic recording head are also one of the "side surfaces," and the "side surfaces" are surfaces which light propagating through the waveguide corresponding to a core is able to totally reflect off.

Note, in the following descriptions, the thermally-assisted magnetic recording head may be simply referred to as a magnetic recording head and magnetic head.

A thermally-assisted magnetic recording head according to one embodiment of the present invention is explained with reference to the drawings.

Figure 1:
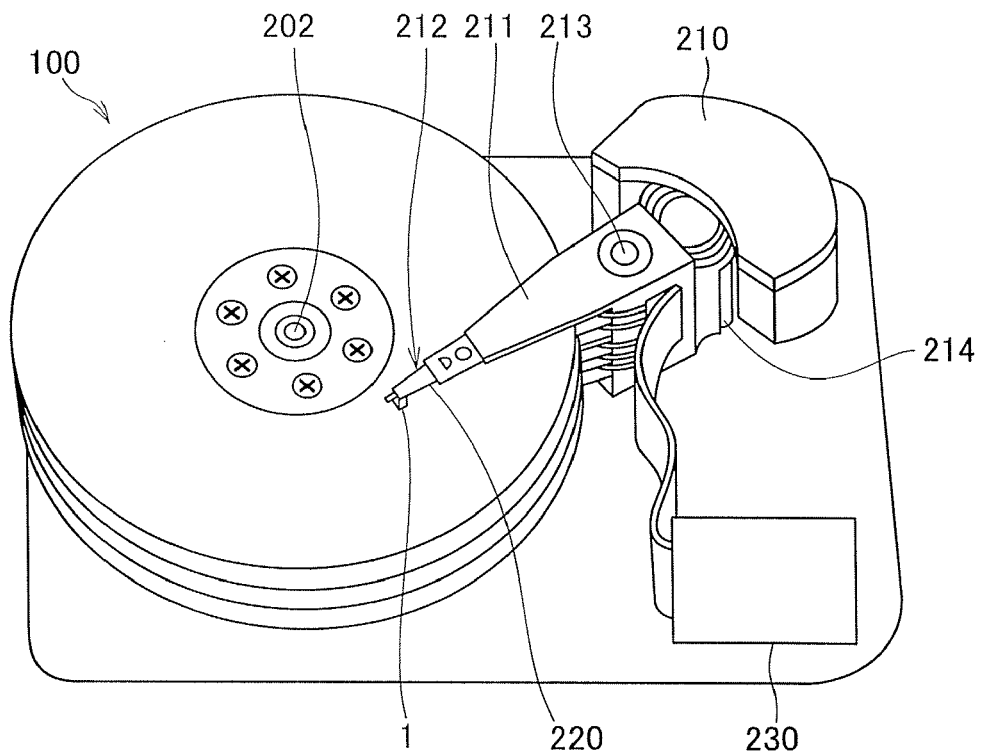
FIG. 1 is a perspective view schematically illustrating a magnetic recording device according to one embodiment of the present invention.
Figure 2:
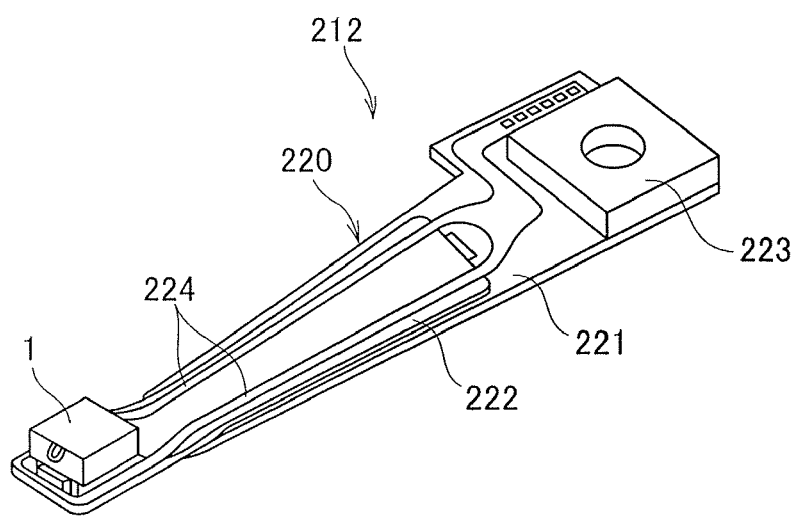
FIG. 2 is a perspective view schematically illustrating a head gimbal assembly (HGA) according to one embodiment of the present invention.

FIG. 1 is a perspective view schematically illustrating a magnetic recording device of the present embodiment. FIG. 2 is a perspective view schematically illustrating a head gimbal assembly (HGA) of the present embodiment.

As illustrated in FIG. 1, a magnetic disk device as a magnetic recording device according to the present embodiment is configured with a plurality of magnetic disks 100, an assembly carriage device 210, head gimbal assemblies (HGA) 212 and a control circuit 230. The magnetic disks 100 rotate around a rotational shaft of a spindle motor 202. The assembly carriage device 210 is provided with a plurality of drive arms 211. The HGAs 212 each is attached to a tip portion of each of the drive arms 211 and has the thermally-assisted magnetic recording head 1, which is a thin film magnetic head, according to the present embodiment. The control circuit 230 controls writing and reading operations of the thermally-assisted magnetic recording head 1 according to the present embodiment and controls a light emission operation of a laser diode, which is a light source that generates laser light for after-mentioned thermally-assisted magnetic recording.

In the present embodiment, the magnetic disks 100, which are magnetic recording media, are for perpendicular magnetic recording and each has a configuration in which, for example, a soft magnetic under layer, an intermediate layer and a magnetic recording layer (perpendicularly magnetized layer) or the like are sequentially laminated above a disk substrate.

The assembly carriage device 210 is a device for positioning the thermally-assisted magnetic recording heads 1 on tracks, which are formed on the magnetic disks 100 and on which recording bits are arrayed. In the assembly carriage device 210, the drive arms 211 are stacked in a direction along a pivot bearing shaft 213 and are angularly swingable by a voice coil motor (VCM) 214 centering around the pivot bearing shaft 213.

Note, the structure of the magnetic disk device of the present embodiment is not limited to the above-described structure but may include only a singular of the magnetic disk 100, the drive arm 211, the HGA 212 and the thermally-assisted magnetic recording head 1.

In the HGA 212 illustrated in FIG. 2, a suspension 220 includes a load beam 221, a flexure 222 that is firmly attached to the load beam 221 and has elasticity, and a base plate 223 provided at a base of the load beam 221. In addition, a wiring member 224 formed from a lead conductor and connection pads electrically connected to both sides of the lead conductor is provided on the flexure 222. The thermally-assisted magnetic recording head 1 according to the present embodiment is firmly attached to the flexure 222 at a tip end portion of the suspension 220 so as to oppose a surface of each of the magnetic disks 100 with a predetermined gap (flying height).

Further, one end of the wiring member 224 is electrically connected to a terminal electrode of the thermally-assisted magnetic recording head 1 according to the present embodiment.

Figure 3:
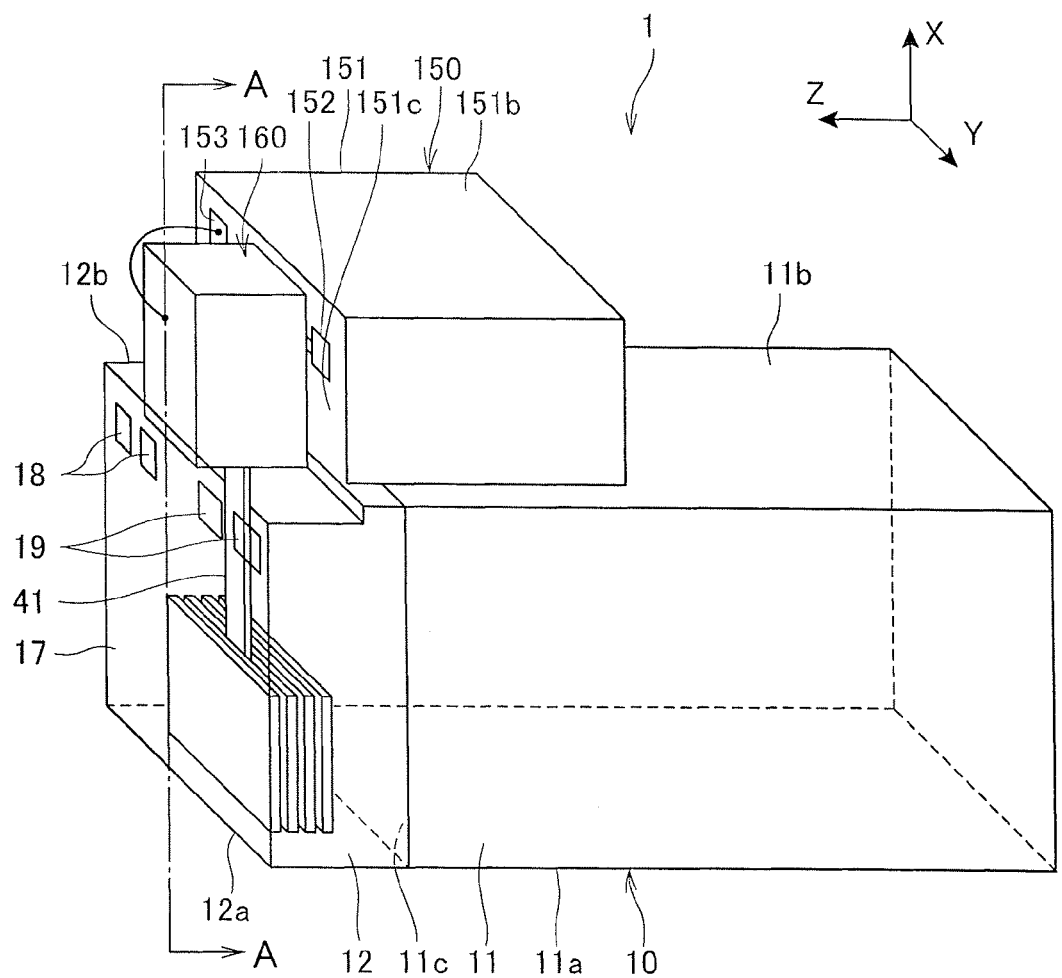
FIG. 3 is a perspective view illustrating a thermally-assisted magnetic recording head according to one embodiment of the present invention.
Figure 4:
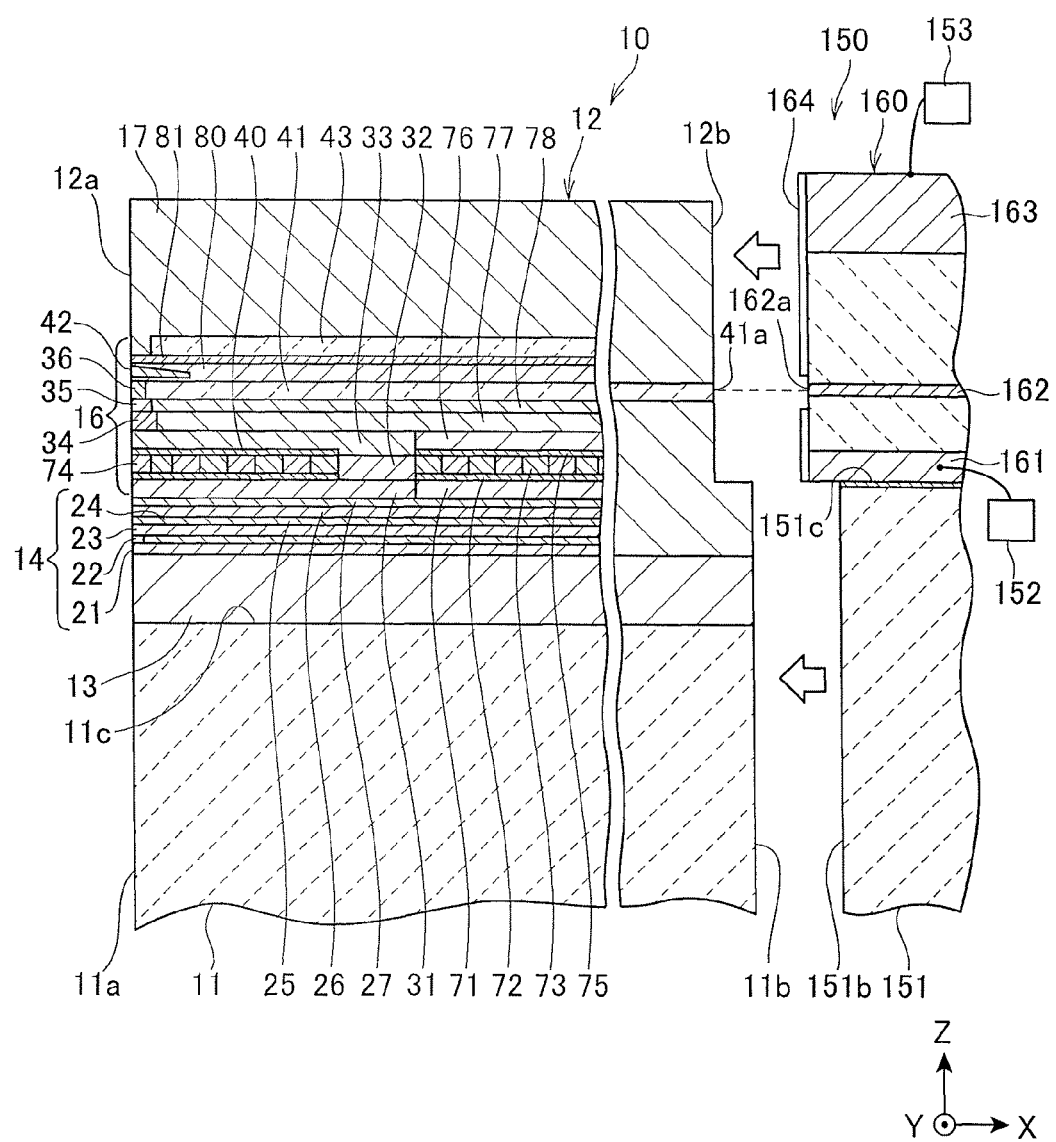
FIG. 4 is a cross-sectional view (XZ plane) along the A-A line of FIG. 3, the view schematically illustrating a configuration of a main part of the thermally-assisted magnetic recording head according to one embodiment of the present invention.
Figure 5:
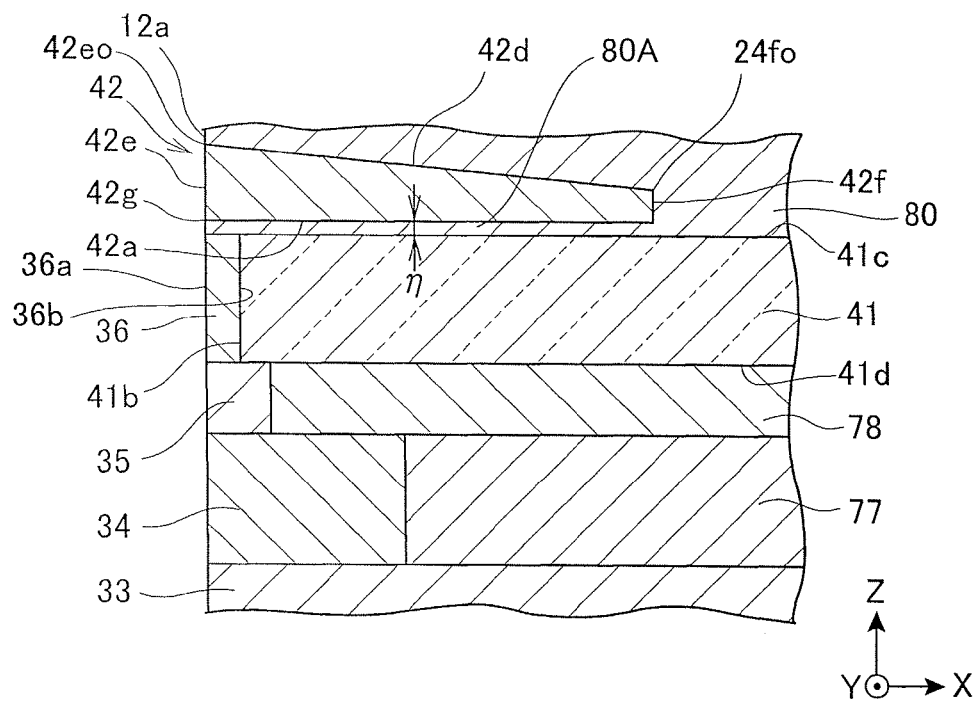
FIG. 5 is a cross-sectional view illustrating one example of a main part of the thermally-assisted magnetic recording head of the present invention.
Figure 6:
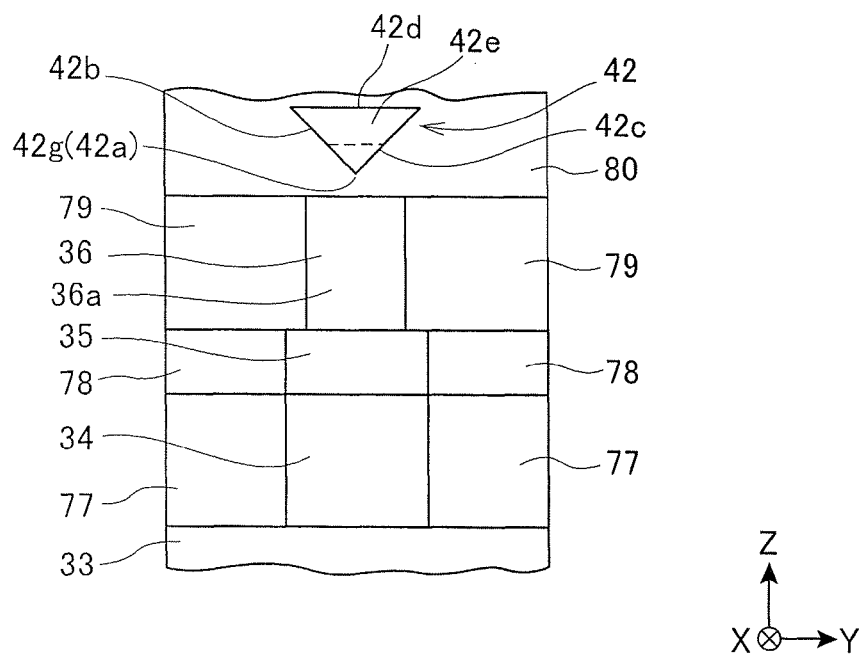
FIG. 6 is a front view illustrating the example of the main part of the thermally-assisted magnetic recording head of the present invention illustrated in FIG. 5.

Next, a description is given regarding a configuration of the thermally-assisted magnetic recording head 1 with reference to FIG. 3-FIG. 6. FIG. 3 is a perspective view illustrating the thermally-assisted magnetic recording head of one embodiment of the present invention. FIG. 4 is a cross-sectional view along the A-A line (XZ plane) in FIG. 3, the view schematically illustrating a configuration of a main part of the thermally-assisted magnetic recording head according to the embodiment of the present invention. FIG. 5 is a cross-sectional view illustrating one example of a main part of the thermally-assisted magnetic recording head of the present invention. FIG. 6 is a front view illustrating the example of the main part of the thermally-assisted magnetic recording head of the present invention illustrated in FIG. 5.

As illustrated in FIG. 3, the thermally-assisted magnetic recording head 1 includes a slider 10 and a light source unit 150. FIG. 4 illustrates a situation in which the slider 10 and the light source unit 150 are separated.

The slider 10 is configured with a slider substrate 11 formed of a ceramic material such as aluminum oxide.titanium carbide ($Al_2O_3$.TiC) or the like in a substantially cuboidal shape and a head part 12 formed above the slider substrate 11.

The slider substrate 11 is configured with an air bearing surface 11a (occasionally referred to as ABS) that opposes the magnetic disk 100, a back surface 11b on the opposite side to the air bearing surface 11a, and four surfaces that connect the air bearing surface 11a with the back surface 11b.

One of the four surfaces that connect the air bearing surface 11a with the back surface 11b is configured as an element formation surface 11c. The element formation surface 11c has a positional relation that is perpendicular to the air bearing surface 11a and the head part 12 is formed on the element formation surface 11c.

The head part 12 has an air bearing surface 12a that opposes the magnetic disk 100 and a back surface 12b on the opposite side to the air bearing surface 12b. The air bearing surface 12a is parallel to the air bearing surface 11a of the slider substrate 11 and forms the same surface. Normally, the air bearing surface 11a is processed so as to obtain an appropriate flying height of the slider 10 with respect to the magnetic disk 100.

During the actual writing and reading, the thermally-assisted magnetic recording head 1 hydro-dynamically flies on the surface of the rotating magnetic disk 100 with a predetermined flying height. At this time, the air bearing surface 12a of the magnetic head opposes the surface of the magnetic recording layer of the magnetic disk 100 with an appropriate magnetic spacing. In this situation, the reading of data signal and the magnetic writing of recording data are performed.

The light source unit 150 includes a laser diode 160 and a supporting member 151 in a cuboidal shape as illustrated in FIG. 3 and FIG. 4. The laser diode 160 is a light source that emits laser light, and the supporting member 151 supports the laser diode 160. The supporting member 151 is configured with a joining surface 151a, a back surface 151b on the opposite side to the joining surface 151a, and four surfaces that connect the joining surface 151a with the back surface 151b.

One of the four surfaces that connect the joining surface 151a with the back surface 151b is configured as a light source installation surface 151c, and the joining surface 151a is configured as a surface that is to be joined with the back surface 11b of the slider substrate 11.

The light source installation surface 151c is formed perpendicular to the joining surface 151a and parallel to the element formation surface 11c. The laser diode 160 is mounted on the light source installation surface 151c. Note, the thermally-assisted magnetic recording head 1 according to the present embodiment may be also configured with the laser diode 160 directly mounted on the slider substrate 11 without using the light source unit 150.

As illustrated in FIG. 4, the head part 12 is configured with an insulating layer 13 that is arranged on the element formation surface 11c, a reproducing head 14 that is configured with multilayer films sequentially laminated above the insulating layer 13, a recording head 16, and a protective layer 17. The protective layer 17 is formed of an insulating material.

The reproducing head 14 is configured with a lower shield layer 21 that is arranged on the insulating layer 13, an MR element 22 that is arranged on the lower shield layer 21, an upper shield layer 23 that is arranged on the MR element 22, and an insulating layer 24 that is arranged between the lower shield layer 21 and the upper shield layer 23 in the vicinity of the MR element 22. The lower shield layer 21 and the upper shield layer 23 function to shield an external magnetic field. The lower shield layer 21 and the upper shield layer 23 are, for example, magnetic layers with a thickness of approximately 0.5-3 μm that formed by a frame plating method, a sputtering method or the like of soft magnetic materials such as, for example, NiFe (permalloy), FeSiAl (sendust), CoFeNi, CoFe, FeN, FeZrN, CoZrTaCr or the like, or a multilayer film formed from these materials.

One end part of the MR element 22 is arranged on the air bearing surface 12a. The MR element 22 is a magnetically sensitive part that senses a signal magnetic field using the MR effect. As the MR element 22, for example, a giant magneto resistance (GMR) element, a tunnel magneto-resistance (TMR) element or the like are used. The GMR element may be a so-called current in plane (CIP) type in which a sense current for magnetic signal detection flows in a direction substantially parallel to each surface configuring the GMR element, and may be also a so-called current perpendicular to plane (CPP) type in which a sense current flows in a direction substantially perpendicular to each surface configuring the GMR element.

As one example of the MR element 22 when the MR element 22 is the TMR element, the MR element 22 has a structure in which the following are sequentially laminated: an antiferromagnetic layer formed of, for example, IrMn, PtMn, NiMn, RuRhMn or the like having a thickness of approximately 5-15 nm; a magnetization pinned layer that has a structure in which two ferromagnetic layers formed of CoFe or the like sandwich a nonmagnetic metal layer formed of Ru or the like and of which a magnetization direction is pinned by the antiferromagnetic layer; a tunnel bather layer formed of a nonmagnetic dielectric material which a metal film formed of Al, AlCu or the like having a thickness of approximately 0.5-1 nm is oxidized by oxygen introduced into a vacuum device or by natural oxidation; and a magnetization free layer that is configured with a double-layer film formed by a layer of CoFe or the like having a thickness of approximately 1 nm and a layer of NiFe or the like having a thickness of approximately 3-4 nm, which are ferromagnetic materials, and that achieves tunnel exchange coupling with the magnetization pinned layer with the tunnel barrier layer therebetween.

When the MR element 22 is the TMR element or the GMR element of the CPP type, the lower shield layer 21 and the upper shield layer 23 may also function as electrodes for letting a sense current flow to the MR element 22. When the MR element 22 is the GMR element of the CIP type, insulating films are disposed respectively between the MR element 22 and the lower shield layer 21 and between the MR element 22 and the upper shield layer 23, and two leads for applying a sense current to the MR element 22 are disposed between the insulating films.

The head part 12 is configured further with an insulating layer 25 that is arranged above the upper shield layer 23, an intermediate shield layer 26 that is formed on the insulating layer 25, and an insulating layer 27 that is arranged on the intermediate shield layer 26.

The intermediate shield layer 26 functions to shield the MR element 22 from a magnetic field generated by the recording head 16. The intermediate shield layer 26 is formed of a soft magnetic material. Note, the disposition of the insulating layer 25 and the intermediate shield layer 26 may be omitted.

The recording head 16 is configured for so-called perpendicular magnetic recording. The recording head 16 is configured with a return yoke layer 31 that is arranged on the insulating layer 27, a linkage layer 32 that is arranged in a recessed position from the air bearing surface 12a on the return yoke layer 31, and an insulating layer 71 that is arranged in the vicinity of the return yoke layer 31 on the insulating layer 27. The return yoke layer 31 and the linkage layer 32 are formed of a soft magnetic material. Note, upper surfaces of the return yoke layer 31 and the insulating layer 71 are planarized.

The recording head 16 is configured further with insulating layers 72 that are arranged on the return yoke layer 31 and the insulating layer 71, and a coil 40 that is arranged on the insulating layers 72. The coil 40 is formed in a plane-spiral shape winding around the linkage layer 32. A current is applied to the coil 40 to generate a magnetic field appropriate for recording information to be recorded to the magnetic disk 100, which is a magnetic recording medium. The coil 40 is formed of a conductive material such as, for example, copper or the like.

The recording head 16 is configured with insulating layers 73 that are arranged between winding lines of the coil 40 and in its vicinity, and in the vicinity of the linkage layer 32, insulating layers 74 that are arranged on the insulating layers 72 in the vicinity of the insulating layers 73, and insulating layers 75 that are arranged on the coil 40 and the insulating layers 73 and 74. Note, upper surfaces of the linkage layer 32, the coil 40 and the insulating layers 73 and 74 are planarized.

The recording head 16 is configured with a yoke layer 33 that is arranged on the linkage layer 32 and the insulating layer 75, and an insulating layer 76 that is arranged in the vicinity of the yoke layer 33 is arranged on the insulating layer 75. The yoke layer 33 is formed of a soft magnetic material. The yoke layer 33 includes an end surface that is arranged on the air bearing surface 12a. Note, upper surfaces of the yoke layer 33 and the insulating layer 76 are planarized.

Further, the recording head 16 is configured with a linkage layer 34 that is arranged on the vicinity of the air bearing surface side of the yoke layer 33, and an insulating layer 77 that is arranged on the yoke layer 33 and the insulating layer 76 in the vicinity of the linkage layer 34. The linkage layer 34 is formed of a soft magnetic material. The linkage layer 34 includes an end surface that is arranged on the air bearing surface 12a. Note, upper surfaces of the linkage layer 34 and the insulating layer 77 are planarized.

Further, the recording head 16 is configured with a linkage layer 35 that is arranged on the linkage layer 34, and a pole 36 that is arranged on the linkage layer 35. The linkage layer 35 and the pole 36 are formed of a soft magnetic material. The linkage layer 35 includes an end surface that is arranged on the air bearing surface 12a. The pole 36 includes an end surface that is arranged on the air bearing surface 12a and a rear end surface on the opposite side to the end surface. The pole 36 is preferably formed from a soft magnetic material having a higher saturation magnetic flux density than the yoke layer 33, and is preferably formed from a soft magnetic material such as, for example, FeNi, FeCo, FeCoNi, FeN, FeZrN or the like, which are iron-based alloy materials having Fe as a main component. The thickness of the pole 36 in the Z direction is preferably set to be approximately 0.1-0.8 μm. Furthermore, the width of the pole 36 in the Y direction is preferably set to be approximately 0.2-0.3 μm.

In the members configuring the recording head 16, the return yoke layer 31, the linkage layer 32, the yoke layer 33, the linkage layers 34 and 35, and the pole 36 configure a so-called magnetic path through which a magnetic flux corresponding to a magnetic field generated by applying a current to the coil 40 passes. The magnetic flux corresponding to the magnetic field generated by applying the current to the coil 40 passes through the pole 36, and the pole 36 generates a recording magnetic field to record information to the magnetic disk 100 by the perpendicular magnetic recording method.

Further, the recording head 16 includes a core 41 that forms a waveguide through which laser light propagates and a cladding that is formed in the vicinity of the core 41. In the present embodiment, the cladding includes cladding layers 78, 79 and 80 (see FIG. 6 in particular). Hereinafter, the core 41 is occasionally referred to as a waveguide 41.

The cladding layer 78 is arranged on the linkage layer 34 and the insulating layer 77. Note, upper surfaces of the linkage layer 34 and the cladding layer 78 are planarized. The core 41 is arranged on the linkage layer 35 and the cladding layer 78. The cladding layers 79 are not illustrated in FIG. 4 because the drawing is a cross-sectional view; however, the cladding layers 79 are arranged on the linkage layer 35 and the cladding layer 78 in the vicinity of the pole 36 and the core 41 as illustrated in FIG. 6. Note, upper surfaces of the pole 36, the core 41 and the cladding layers 79 are planarized. The cladding layer 80 is arranged on the pole 36, the core 41 and the cladding layers 79.

As illustrated in FIG. 4, the core 41 (waveguide 41) is extended in a direction (X direction) perpendicular to the air bearing surface 12a. The core 41 has an incident end 41a. Laser light emitted from the laser diode 160 and entering into the incident end 41a propagates through the core 41. The core 41 is formed of a dielectric body material through which the laser light passes. The cladding layers 78, 79 and 80 are formed of a dielectric body material and have a smaller refractive index than the refractive index of the core 41.

For example, when the wavelength $\lambda_L$ of laser light is 600 nm and when the cladding layers 78, 79 and 80 are formed of SiO$_2$ (silicon dioxide; n=1.46), the core 41 (waveguide 41) may be formed of Al$_2$O$_3$ (alumina; n=1.63). In addition, when the cladding layer 78, 79 and 80 are formed of Al$_2$O$_3$ (n=1.63), the core 41 (waveguide 41) may be formed of SiO$_x$N$_y$ (n=1.7-1.85), Ta$_2$O$_5$ (n=2.16), Nb$_2$O$_5$ (n=2.33), TiO (n=2.3-2.55) or TiO$_2$ (n=2.3-2.55). When the core 41 (waveguide 41) is formed of such materials, propagation loss of the laser light can be suppressed to low because of excellent optical characteristics that the materials themselves have.

Further, the core 41 (waveguide 41) may have a multilayer structure made of dielectric materials in which the layers positioned in the upper portion have the higher refractive index n. For example, such a multilayer structure may be established by sequentially laminating dielectric materials of which composition ratio (X, Y) in SiO$_x$N$_y$ are appropriately varied. The number of laminated layers may be 8-12 layers, for example.

In the present embodiment, the recording head 16 includes a plasmon generator 42 surrounded by the cladding layer 80. The plasmon generator 42 is a heating element that generates near-field light and heats the magnetic disk 100 with the near-field light. The plasmon generator 42 is arranged above the pole 36 (on +Z side) with respect to the pole 36, which is a so-called trailing side arrangement, in the vicinity of the air bearing surface 12a in the present embodiment; however, the plasmon generator 42 is not limited to this configuration, and may be arranged under the pole 36 (on −Z side) with respect to the pole 36, which is a so-called leading side arrangement. The detail configuration of the leading side arrangement is described below. The plasmon generator 42 is preferably formed of a conductive material such as a metal, which is, for example, Pd, Pt, Rh, Ir, Ru, Au, Ag, Cu or Al, or an alloy made of at least two types selected from these metals. Specifically preferable materials are Au, Ag and Cu.

The plasmon generator 42 of the present invention has a characteristic form in which a cross-sectional area gradually decreases as going toward the depth side from the air bearing surface when the plasmon generator is observed from a cross-section parallel to the air bearing surface. Descriptions regarding this are given below as a main portion of the invention.

As illustrated in FIG. 4, the recording head 16 in the present embodiment further includes an insulating layer 81 that is arranged above the plasmon generator 42 and the cladding layer 80, and a cooling layer 43 that is arranged on the insulating layer 81. The cooling layer 43 absorbs heat generated by the plasmon generator 42 and cools the plasmon generator 42. A portion of a lower surface of the cooling layer 43 opposes an upper surface of the plasmon generator 42 with the insulating layer 81 disposed therebetween. The cooling layer 43 is formed of a nonmagnetic material having a large thermal conductive ratio such as, for example, SiC or the like.

As illustrated in FIG. 4, the protective layer 17 is arranged so as to cover the recording head 16. As illustrated in FIG. 3, the head part 12 further includes a pair of terminals 18 that are arranged on an upper surface of the protective layer 17 and that are electrically connected to the MR element 22, and a pair of terminals 19 that are arranged on the upper surface of the protective layer 17 and that are electrically connected to the coil 40. These terminals 18 and 19 are electrically connected to a plurality of pad-shaped terminals of the wiring member 224 illustrated in FIG. 2.

As illustrated in FIG. 4, the laser diode 160 has a multilayer structure including a lower electrode 161, an active layer 162 and an upper electrode 163. On two cleavage surfaces of the multilayer structure, a reflection layer 164 is disposed which light totally reflects off to excite oscillation. On the reflection layer 164, an aperture from which laser light emits is disposed at the position of the active layer 162 including an emission center 162a.

The light source unit 150 further includes a terminal 152 that is arranged on a light source installation surface 151c and that is electrically connected to the lower electrode 161, and a terminal 153 that is arranged on the light source installation surface 151c and that is electrically connected to the upper electrode 163. These terminals 152 and 153 are electrically connected to a plurality of pad-shaped terminals of the wiring member 224 illustrated in FIG. 2. When a predetermined voltage is applied to the laser diode 160 via the terminals 152 and 153, laser light emits from the light emission center 162a of the laser diode 160. It is preferred that laser light emitted from the laser diode 160 is polarized light of transverse magnetic (TM) mode of which an oscillation direction of an electric field is perpendicular to a surface of the active layer 162.

As illustrated in FIG. 4, the light source unit 150 is firmly attached to the slider 10 by joining the joining surface 151a of the supporting member 151 and the back surface 11b of the slider substrate 11. Positions of the laser diode 160 and the core 41 are determined such that laser light emitted from the laser diode 160 enters the incident end 41a of the core 41.

(Description of Main Part of the Present Invention)

<First Embodiment of Plasmon Generator 42>

Next, with reference to FIG. 5 and FIG. 6, the shape and arrangement of the core 41 (waveguide 41), the plasmon generator 42, and the pole 36 are described in detail.

FIG. 5 is the cross-sectional view illustrating the main part of the magnetic head 1. FIG. 6 is the front view illustrating the main part of the magnetic head 1. As illustrated in FIG. 5 and FIG. 6, the pole 36 includes an end surface 36a that is arranged on the air bearing surface 12a.

The core 41, as illustrated in FIG. 5, includes a front end surface 41b nearer to the air bearing surface 12a, an upper surface 41c, a lower surface 41d, and two side surfaces (not illustrated) besides the incident end 41a illustrated in FIG. 4. In the present embodiment, the front end surface 41b of the core 41 (waveguide 41) contacts a rear end surface 36b of the pole 36 (see FIG. 5). With such a configuration, the pole 36 can be positioned in closer to the plasmon generator 42 by decreasing the distance between the pole 36 and the plasmon generator 42, so that it becomes possible to achieve effective thermally-assisted magnetic recording.

The plasmon generator 42 used in the present invention has a portion where a cross-sectional area gradually decreases as going toward the depth side (in the X direction: the height direction) from the air bearing surface 12a when the plasmon generator 42 is observed from a cross-section parallel to the air bearing surface 12a. Namely, as illustrated in FIG. 5 and FIG. 6, the plasmon generator 42 in the present embodiment is configured with a front surface 42e, a rear surface 42f, a propagation edge 42a, a first inclined surface 42b, a second inclined surface 42c and an upper surface 42d. The front surface 42e, in a shape of an inverted triangle, is located on the same surface as the air bearing surface 12a. The rear surface 42f, in a shape of an inverted triangle with a smaller area than the front surface 42e on the depth side, is located in a depth side position opposing the front surface 42e. The propagation edge 42a forms a ridge line along the apex of the inverted triangle in the X direction. The first inclined surface 42b and the second inclined surface 42c are linked to the propagation edge 42a, and the distance between the first inclined surface 42b and the second inclined surface 42c increases as being away from the propagation edge 42a. The upper surface 42d forms an upper part of the inverted triangle. As will be described below, the propagation edge 42a configures a transmit part that propagates plasmon, and a near-field light generating edge 42g is positioned on the air bearing surface 12a, which is an end of the propagation edge 42a, and corresponds to the near-field light generating end surface that generates near-field light.

In the upper surface 42d of the plasmon generator 42, the highest position (reference number $42e_0$ in FIG. 5) in the Z direction is on the air bearing surface 12a side, the upper surface 42d gradually lowers toward a lower side (in the −Z direction) as going toward the depth side (in the X direction) from the air bearing surface 12a side, and the lowest position is a portion (reference number $42f_0$ in FIG. 5) that forms an upper portion of the rear surface 42f on the depth side. Also, a gap η (see FIG. 5) between the propagation edge 42a forming the ridge line of the apex of the inverted triangle of the plasmon generator 42 and the upper surface 41c of the core 41 (waveguide 41) is constant from the air bearing surface 12a side to the depth side (in the X direction). It is noted that forms of Type C or Type D illustrated in the perspective view of FIG. 13 can be referred as pictorial drawings (modified triangular prisms) of the plasmon generator 42.

As illustrated, the plasmon generator 42 of the present embodiment has a form as a preferable form in which a cross-sectional area continuously gradually decreases from the air bearing surface 12a to the depth side (in the X direction: the height direction) when the plasmon generator 42 is observed from a cross-section parallel to the air bearing surface 12a. However, the plasmon generator 42 is not limited to the configuration in which the cross-sectional area continuously gradually decreases, and a configuration in which a portion where a cross-sectional area gradually decreases exists partially between the air bearing surface 12a side and the depth side (in the X direction) is also applicable. For example, the portion where the cross-sectional area gradually decreases may not exist partially between the air bearing surface 12a side and the depth side (in the X direction).

As described above, since the plasmon generator 42 of the present invention has the portion where the cross-sectional area gradually decreases as going from the air bearing surface 12a toward the depth side (in the X direction: the height direction), the volume of the plasmon generator 42 itself can be decreased and an exposed area of the front surface 42e on the air bearing surface 12a can be formed larger. Therefore, even when a thermal expansion in connection with the temperature increase occurs in the plasmon generator 42, ΔP1, a rate that the plasmon generator 42 projects from a so-called ABS that is the air bearing surface 12a, is suppressed to extremely low.

Figure 17:
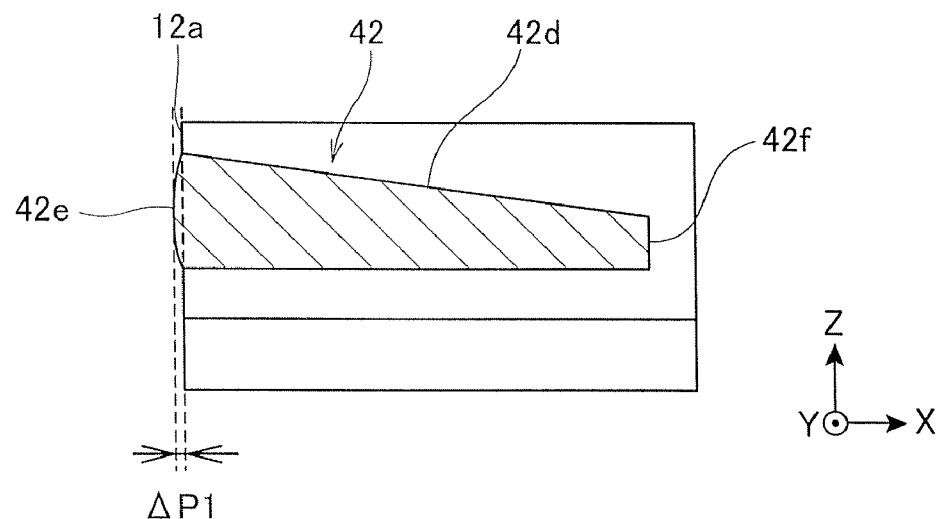
FIG. 17 is a cross-sectional view, for explaining the function of the plasmon generator of the present invention, simply and schematically illustrating one example of a main part of a thermally-assisted magnetic recording head.
Figure 18:
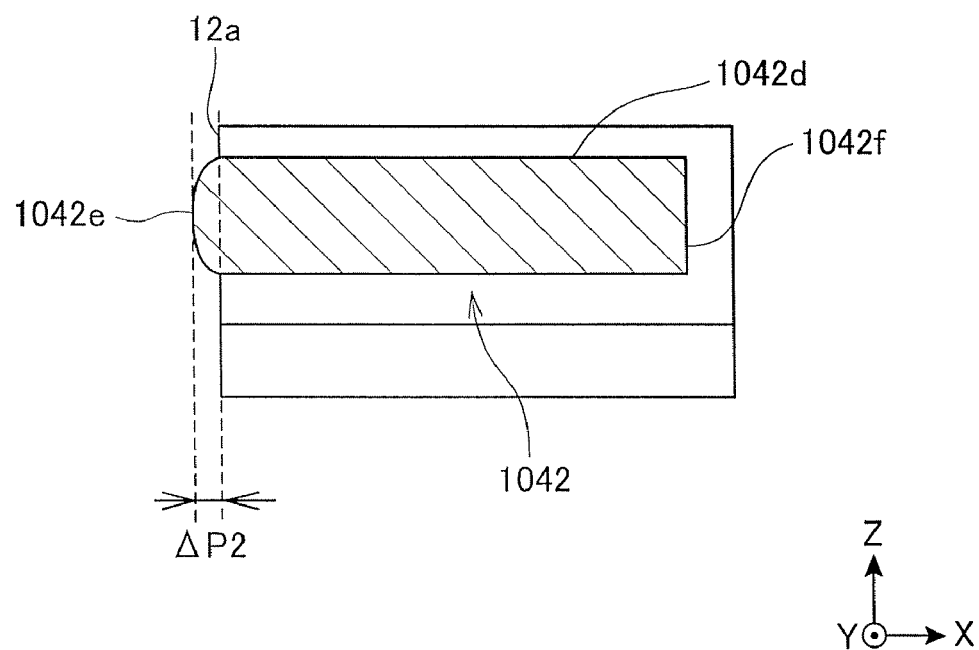
FIG. 18 is a cross-sectional view, for explaining the function of a conventional plasmon generator, simply and schematically illustrating one example of a main part of a thermally-assisted magnetic recording head.

FIG. 17 is a view schematically illustrating this phenomenon. FIG. 17 is a cross-sectional view that explains a function of the plasmon generator of the present invention and that simply schematically illustrates one example of a main part of the thermally-assisted magnetic recording head. As illustrated in the figure, the projection rate Δ1 caused by the thermal expansion is extremely small. On the other hand, FIG. 18 is a cross-sectional view that explains a function of a conventional plasmon generator and that schematically illustrates a main part. In a conventional plasmon generator 1042 illustrated in FIG. 18, an area of a front surface 1042e is the same as that of the front surface 42e of the present invention; however, the cross-sectional area from the air bearing surface 12a to the depth side (in the X direction: the height direction) is constant without any change. Therefore, the total volume of the plasmon generator of the conventional example is larger, and the projection rate ΔP2 of the conventional example caused by the thermal expansion is extremely larger than ΔP1.

Since, in the present invention, ΔP1, the rate that the plasmon generator 42 is projected from the ABS that is the air bearing surface 12a, is suppressed to be extremely small, a percentage that the plasmon generator that has been projected from the ABS collides against the magnetic recording medium becomes low; therefore, occurrence of problems that are the loss of the plasmon generator, the reduction of the flying stability or the like can be suppressed. In other words, in the present invention, a degree of a shape deformation of the plasmon generator caused by the thermal expansion can be suppressed and chronological degradation of output can be suppressed, so that the thermally-assisted recording with long-term and high reliability can be obtained.

As an additional description referring to FIG. 5, a portion of the cladding layer 80 that is arranged between the upper surface 41c (evanescent light generating surface) of the core 41 (waveguide 41) and the propagation edge 42a of the plasmon generator 42 configures a buffer portion 80A with a refractive index smaller than the refractive index of the core 41.

Also, both the width in the track width direction (Y direction) of the plasmon generator 42 on the air be a ring surface 12a illustrated in FIG. 6 and the height in the Z direction of the plasmon generator 42 on the air bearing surface 12a are even smaller than a wavelength of laser light propagating through the core 41. The width and the height are preferably set in the range of, for example, 10-100 nm. Also, the length in the X direction of the plasmon generator 42 is preferably set in the range of, for example, 0.6-4 µm.

Also, both the length in the X direction of a portion of the propagation edge 42a of the plasmon generator 42, the portion opposing the upper surface 41c of the core 41 (waveguide 41) that generates evanescent light, and the gap µ between the propagation edge 42a and the upper surface 41c are important parameters for realizing an appropriate excitation and propagation of the surface plasmon. The above-described length in the X direction is preferably in the range of 0.6-4.0 µm and is preferably larger than the wavelength of the laser light propagating through the core 41. Also, the above-described gap η is preferably in the range of 10-100 nm.

Furthermore, with reference to FIG. 5 and FIG. 6, descriptions regarding a principle of near-field light generation in the present embodiment and a principle of a thermally-assisted magnetic recording using the near field light will be given.

Laser light emitted from the laser diode 160 propagates through the core 41 of the waveguide to the vicinity of a buffer portion 80A. At this point, evanescent light penetrating into the buffer portion 80A is generated by the laser light totally reflecting off an interface between the core 41 and the buffer portion 80A. Next, surface plasmon polariton mode is induced by coupling the evanescent light with fluctuation of charge on at least the propagation edge 42a out of the outer surfaces of the plasmon generator 42. As described above, surface plasmon is excited by occurrence of coupling with the evanescent light generated on the upper surface 41c of the core 41 (waveguide 41) on at least the propagation edge 42a.

The surface plasmon excited on at least the propagation edge 42a out of the outer surfaces of the plasmon generator 42 becomes in a state of edge plasmon and propagates along the propagation edge 42a toward the near-field light generating edge 42g on the air bearing surface 12a side. As a result, the edge plasmon is concentrated to the near-field light generating edge 42g, and thereby near-field light is generated from the near-field light generating edge 42g (equivalent to the near-field light generating end surface) based on the edge plasmon.

The near-field light heats a portion of the magnetic recording layer of the magnetic disk 100. Accordingly, coercive force of the portion of the magnetic recording layer decreases. In the thermally-assisted magnetic recording, information is recorded by applying a recording magnetic field generated from the pole 36 to the portion of the magnetic recording layer of which coercive force is reduced as described above.

<Second Embodiment of Plasmon Generator>

Figure 7:
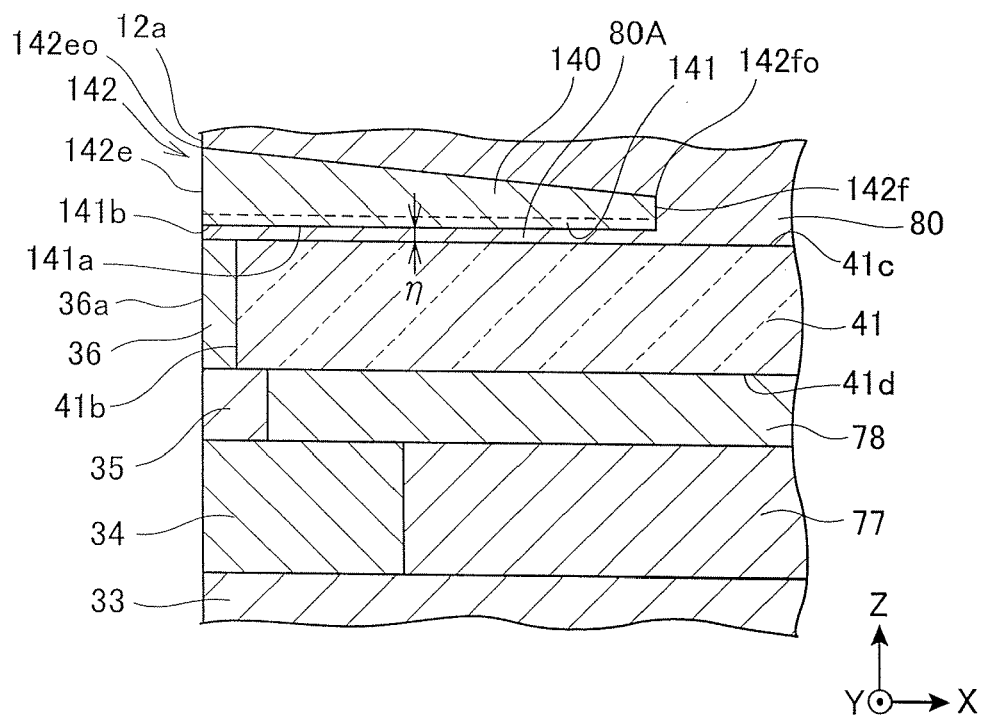
FIG. 7 is a cross-sectional view illustrating one example of the main part of the thermally-assisted magnetic recording head of the present invention.
Figure 8:
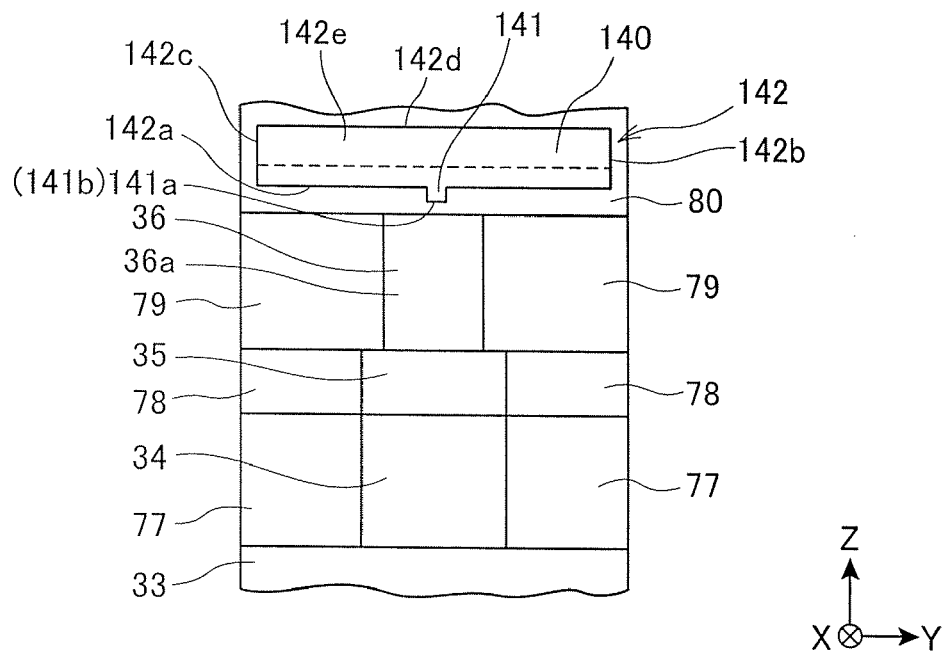
FIG. 8 is a front view illustrating the example of the main part of the thermally-assisted magnetic recording head of the present invention illustrated in FIG. 7.

Next, with reference to FIG. 7 and FIG. 8, detailed description regarding shapes and arrangements of the core 41, a plasmon generator 142, and the pole 36 is given. FIG. 7 is a cross-sectional view illustrating a main part of the magnetic head 1. FIG. 8 is a front view illustrating the main part of the magnetic head 1.

A different point between the embodiment illustrated in FIG. 7 and FIG. 8 and the above-described embodiment illustrated in FIG. 5 and FIG. 6 is that a form of the plasmon generator 142 is modified. However, there is no change for the basic technical thought that the plasmon generator has the portion where the cross-sectional area gradually decreases as going toward the depth side from the air bearing surface.

The plasmon generator 142 illustrated in FIG. 7 and FIG. 8 is configured with a tabular part 140 having a preferable thickness and a convex part 141 that functions as a transmit part projected toward the core 41 (waveguide 41) side from the tabular portion 140.

The tabular part 140 has a portion where a cross-sectional area gradually decreases as going toward the depth side from the air bearing surface when the plasmon generator 142 is observed from a cross-section parallel to the air bearing surface 12a. In other words, when the plasmon generator 142 is examined with reference to only the tabular part 140 but the convex part 141, the tabular part 140 of the plasmon generator 142 of the present embodiment has a front surface 142e, a rear surface 142f, side surfaces 142b and 142c, an upper surface 142d and a lower surface 142a. The front surface 142e, being rectangular, exists on the same surface as the air bearing surface 12a. The rear surface 142f exists in the position on the depth side opposing the front surface 142e and is rectangular having a smaller area than the front surface 142e. The side surfaces 142b and 142c, the upper surface 142d and the lower surface 142a are formed so as to sterically connect the front surface 142e and the rear surface 142f.

In the upper surface 142d of the tabular part 140, the highest position (reference number $142e_0$ in FIG. 7) in the Z direction is on the air bearing surface 12a side, the upper surface 142d gradually lowers toward a lower side (in the −Z direction) as going toward the depth side (in the X direction) from the air bearing surface 12a side, and the lowest position is a portion (reference number $142f_0$ in FIG. 7) that forms an upper portion of the rear surface 142f on the depth side.

Figure 15:
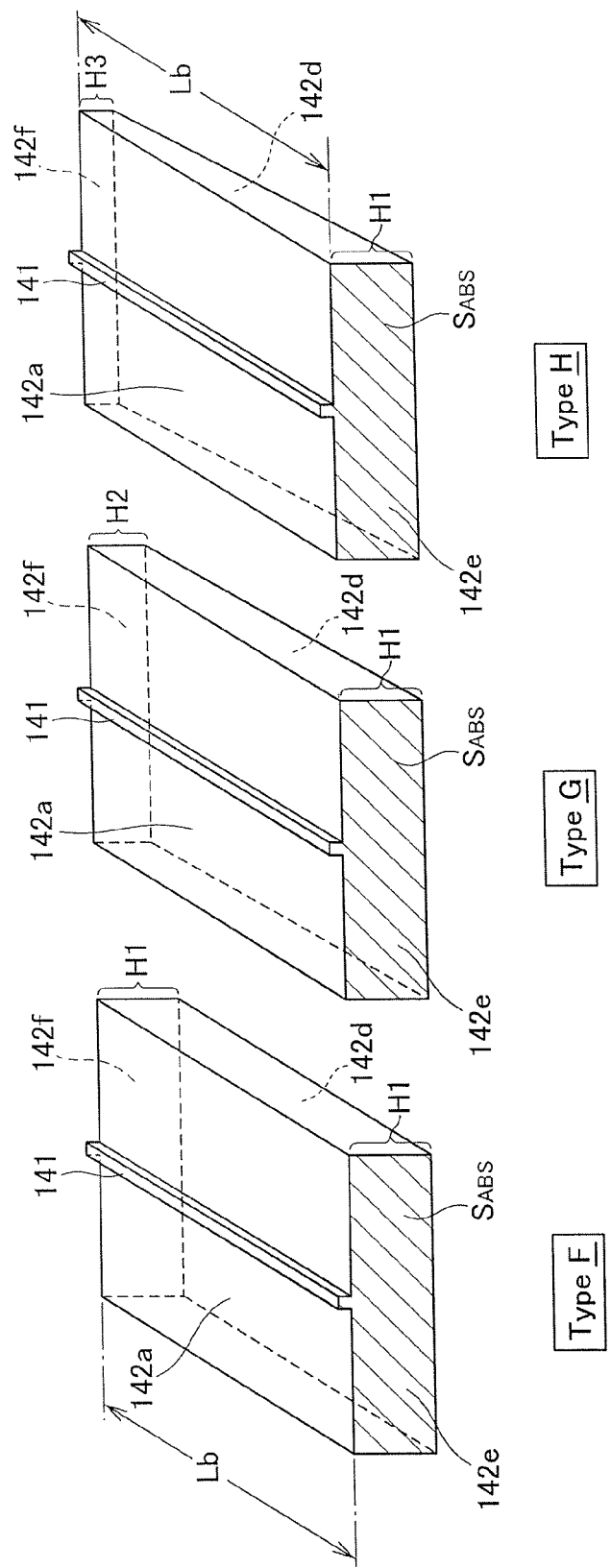
FIG. 15 is a schematically perspective view illustrating three types of plasmon generators, which are Type E, F and G, each having a different form.

It is noted that forms of Type G or Type H illustrated in a perspective view of FIG. 15 can be referred as pictorial drawings (perspective views) of the plasmon generator 142.

The plasmon generator 142 of the present embodiment has a form as a preferable form in which a cross-sectional area continuously gradually decreases as going from the air bearing surface 12a to the depth side (in the X direction: the height direction) when the plasmon generator 142 is observed from a cross-section parallel to the air bearing surface 12a. However, the plasmon generator 142 is not limited to the form in which the cross-sectional area continuously gradually decreases, and a form in which a portion where a cross-sectional area gradually decreases exists partially between the air bearing surface 12a side and the depth side (in the X direction) is applicable. For example, the portion where the cross-sectional area gradually decreases may not exist partially between the air bearing surface 12a side and the depth side (in the X direction).

As described above, since the plasmon generator 142 of the present invention has the portion where the cross-sectional area gradually decreases as going from the air bearing surface 12a toward to the depth side (in the X direction: the height direction), the volume of the plasmon generator 142 itself can be decreased and an exposed area of the front surface 142e on the air bearing surface 12a can formed larger. Therefore, even when a thermal expansion in connection with the temperature increase occurs in the plasmon generator 142, a rate that the plasmon generator 142 projects from a so-called ABS that is the air bearing surface 12a is suppressed to extremely low.

Also, the convex part 141 as the transmit part is formed to have the same length along the X direction of the lower surface 142a of the tabular part 140. Similarly, the convex part 141 is in the nearest position to the upper surface 41c of the core 41 (waveguide 41) and also has an extremely narrow width in the Y axis direction so that electric field is more likely to be concentrated; therefore, the surface plasmon is more likely to be excited. The gap η (see FIG. 7) between a projection tip end surface 141a of the convex part 141 and the upper surface 41c of the core 41 (waveguide 41) is constant from the air bearing surface 12a side to the depth side (in the X direction). The gap η (see FIG. 7) is preferred to be, for example, approximately 15-40 nm, more preferably 25-30 nm. When the gap η is in the above-described range, it is possible to increase a light density so as to further decrease a light spot diameter of the near-field light to be irradiated to the magnetic disk 100.

In the present invention, the projection tip end surface 141a of the convex part 141 of the plasmon generator 142 exists along the X direction, and its air bearing surface 12a side configures a near-field light generating end surface 141b.

The convex part 141 of the plasmon generator 142 opposes the core 41 (waveguide 41) with the buffer portion 80A therebetween and is extended to the near-field light generating end surface 141b. Thereby, the convex part 141 can achieve the function to propagate the surface plasmon excited by the laser light (waveguide light) that has propagated through the core 41 (waveguide 41). In other words, the plasmon generator 142 is coupled with the waveguide light in the surface plasmon mode to propagate the surface plasmon onto the convex part 141. As a result, near-field light is generated from a near-field light generator on the near-field light generating end surface 141b.

The projection height of the convex part 141 is preferably set to approximately 20-30 nm. Also, the width of the near-field light generating end surface 141b of the convex part 141 in the Y direction is smaller than a wavelength of the laser light (waveguide light) and is preferably 15-30 nm. The height between the upper surface 142d of the tabular part 140 and the projection tip end surface 141a of the convex part 141 is preferably 45-75 nm.

Furthermore, the length in the X axis direction of the plasmon generator 142 is preferably 0.6-1.8 μm, more preferably approximately 1.2 μm. When the plasmon generator 142 and the convex part 141 have the above-described size, it is possible to decrease the light spot diameter of the near-field light to be irradiated to the magnetic disk 100.

In the present embodiment, a tabular shape of the projection tip end surface 141a of the convex part 141 is formed to be a long and narrow rectangle; however, a long and narrow trapezoidal shape with a small tapered part of approximately 1-3 degrees in the X direction is also applicable.

Also, the tabular part 140 of the plasmon generator 142 can achieve the function, which is like a so-called heatsink, to release heat generated on the near-field light generating end surface. As a result, an excessive temperature increase of the plasmon generator 142 is suppressed so that it becomes possible to contribute to prevent an unnecessary projection of the near-field light generating end surface toward the ABS side and a significant decrease of light usage efficiency in the plasmon generator 142.

A case will be considered that the above-described plasmon generator provided to the thermally-assisted magnetic recording head of the present invention is configured with a material M selected from each type of the above-described metals and is utilized when the temperature increase is in the situation of Tup in connection with the near-field light generation. In that case, it is preferred to configure with a portion where a cross-sectional area gradually decreases as going toward the depth side from the air bearing surface so as to obtain an opening ratio δo that is an effective opening ratio δef or greater, which is defined by an expression described below. In other words, this technically explains an appropriate size of the portion where the cross-sectional area gradually decreases, which is to be disposed, using the opening ratio δo that is no less than the effective opening ratio δef. A detailed description regarding this will be given later to provide easier understanding.

The opening ratio δo is defined by a following expression. Namely, it is defined as:

δo=(depth length $Lb$ of plasmon generator×area $S_{ABS}$ of air bearing surface of plasmon generator)/ (volume $V$ of plasmon generator).

Figure 13:
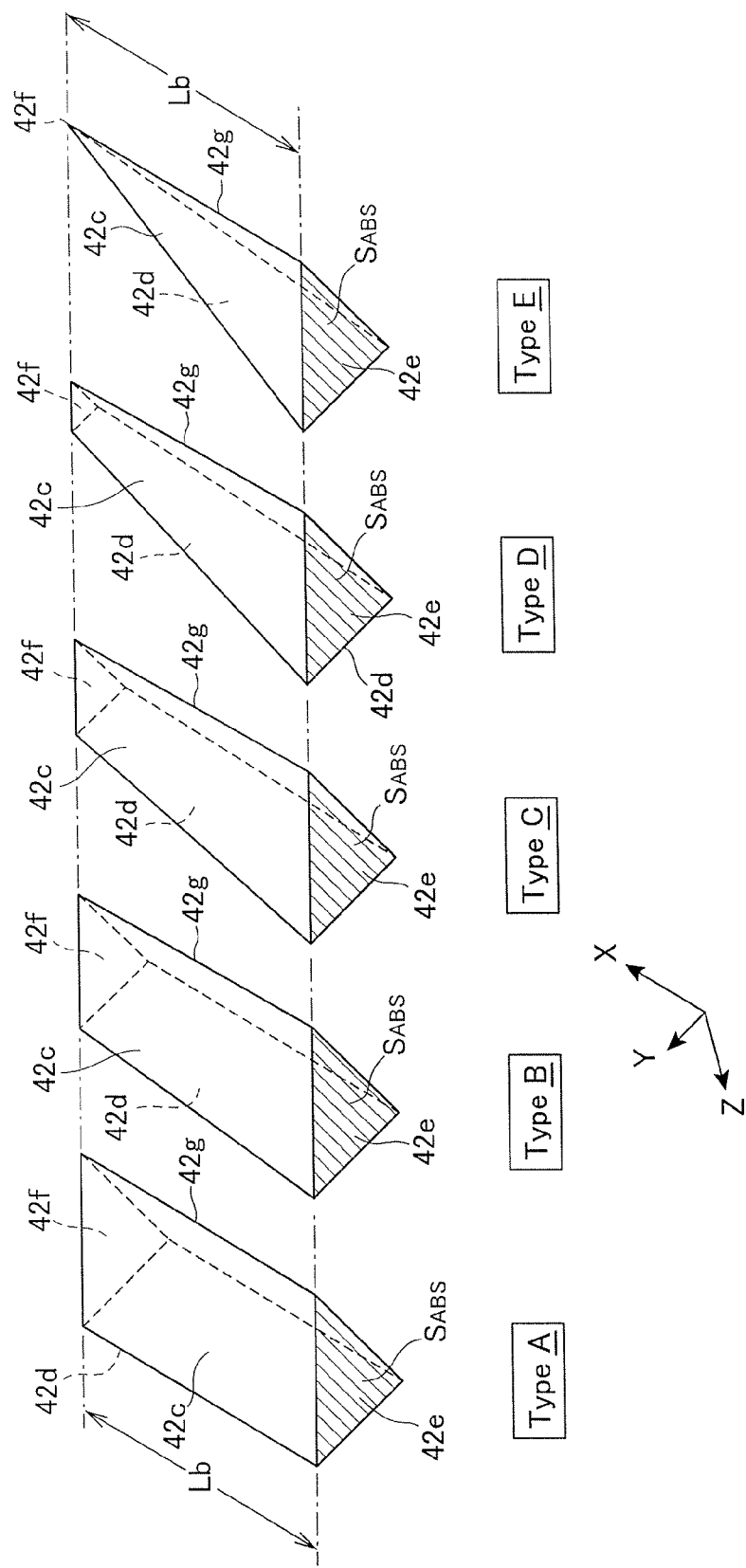
FIG. 13 is a schematically perspective view illustrating five types of plasmon generators, which are Type A, B, C, D and E, each having a different form.

It is noted to refer the references $Lb$ and $S_{ABS}$ illustrated in the drawing of FIG. 13.

Also, the effective opening ratio δef is defined by a following expression. Namely, it is defined as:

δef=1.3×[(1+linear expansion ratio of material $M$×element increased temperature $Tup$)$^3$−1]/[(1+linear expansion ratio of Au×200)$^3$−1].

Hereinafter, a description regarding a process why such an effective opening ratio δef was derived.

FIG. 13 illustrates perspective views of shapes of five types of plasmon generators, Types A-E, which are appropriately modified from a basic triangular prism.

Areas $S_{ABS}$ that are exposed to the ABS that is the air bearing surface of these five types of plasmon generators are equivalent to each other. Then, a distance η between the waveguide and the plasmon generator is maintained to be constant. Types B-E have configurations in which respective cross-sectional areas decreases as going toward the depth side from the ABS. Note, Type A has a so-called triangular prism shape, which is a basic shape, in which a cross-sectional area does not change as going toward the depth side from the ABS.

Herein, in order to define an area of the ABS with respect to the volume of the plasmon generator, an indicator "opening ratio δo" is set that is defined by "(depth length Lb of plasmon generator×area $S_{ABS}$ of air bearing surface of plasmon generator)/(volume V of plasmon generator)."

The opening ratio δo of Type A that is the triangular prism shape as the so-called basic shape is one. The opening ratio δo of Type E (a triangular pyramid) having a one-third of the volume compared to Type A is three. Table 1 illustrates the relation between the structure and the opening ratio δo for the respective plasmon generators of Types A-E illustrated in FIG. 13.

TABLE 1

| Type of Plasmon Generator (PG) | Standardization PG Volume | Opening ratio δo |
|---|---|---|
| Type A | 1.00 | 1.0 |
| Type B | 0.9 | 1.1 |
| Type C | 0.8 | 1.3 |
| Type D | 0.6 | 1.7 |
| Type E | 0.3 | 3.0 |

Note, the standardization PG volume illustrated in Table 1 shows the relative volume in relation to the case that the volume of Type A was set to one.

Lifetime was defined from a point when output was reduced by 5% with following conditions: a material of the plasmon generator was Au (linear expansion ratio 14.1×10$^{-6}$); the plasmon generator was integrated in the thermally-assisted magnetic recording head as illustrated in FIG. 1-FIG. 6; continuous thermally-assisted recording was performed for each element.

Figure 14:
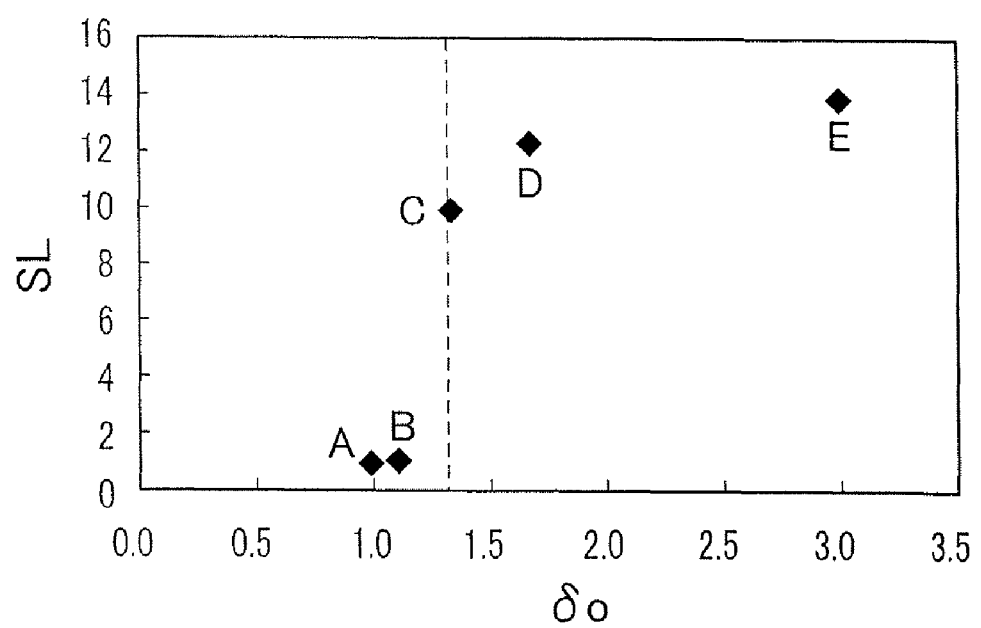
FIG. 14 is a graph illustrating the relation between the opening ratio δo and the standardization lifetime SL, which was obtained from experiments, of the five types of plasmon generators, which are Type A, B, C, D and E illustrated in FIG. 13, each having the different form.

FIG. 14 illustrates standardization lifetimes SL for the structures Types B-E when the lifetime of Type A was set to one. Letters A-E illustrated in the drawing of FIG. 14 indicate the types.

According to the results illustrated in FIG. 14, it can be concluded that the structure with a larger opening ratio δo has a longer lifetime so that adopting the structure of the plasmon generator that has a higher opening ratio δo is extremely effective to improve the reliability of the head. In other words, when the plasmon generator having a modified triangular prism structure uses Au for a material of the plasmon generator and when a temperature increase of the element is 200° C., it can be understood that the plasmon generator with the opening ratio of 1.3 or greater is specifically effective. Then, limited to the case with the above-described conditions, it is useful to set the value as "effective opening ratio δef."

In order to experiment whether or not the relation between the opening ratio and the lifetime can be realized even with other structures of the plasmon generator having drastically modified shapes, three types of plasmon generator elements Type F, Type G, and Type H, which were a convex-shaped plasmon generator illustrated in FIG. 15 and each had a different opening ratio, were manufactured. Note, the relation of the heights of the rear surfaces 142$f$ of Type F, Type G, and Type H was H1>H2>H3.

TABLE 2

| Type of Plasmon Generator (PG) | Standardization PG Volume | Opening ratio δo |
|---|---|---|
| Type F | 1.00 | 1.0 |
| Type G | 0.9 | 1.1 |
| Type H | 0.8 | 1.3 |

Note, the standardization PG volume illustrated in Table 2 shows the relative volume in relation to the case that the volume of Type F was set to one.

Figure 16:
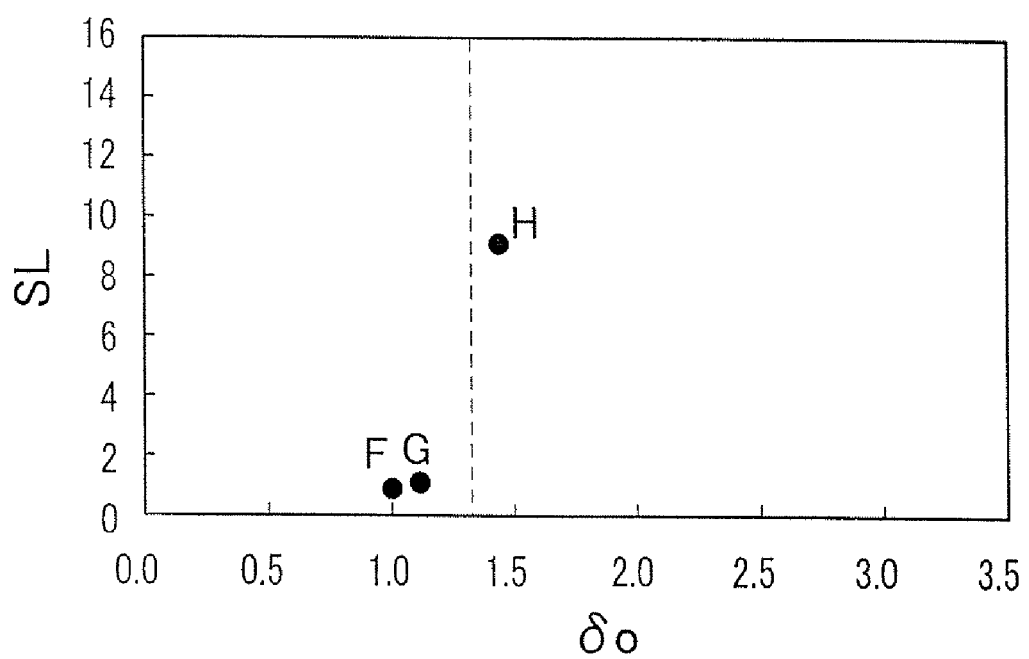
FIG. 16 is a graph illustrating the relation between the opening ratio δo and the standardization lifetime SL, which was obtained from experiments, of the three types of plasmon generators, which are type E, F and G illustrated in FIG. 15, each having a different form.

Lifetime was defined by a point when output was reduced by 5% with following conditions: a material of the plasmon generator was Au (linear expansion ratio 14.1×10$^{-6}$); the plasmon generator was integrated in the thermally-assisted magnetic recording head as illustrated in FIG. 1-FIG. 6; continuous thermally-assisted recording was performed for each element. FIG. 16 illustrates standardization lifetimes SL for the structures Types G-H when the lifetime of Type F was set to one. Letters F-H illustrated in the drawing of FIG. 16 indicate the types.

According to the results illustrated in FIG. 16, it can be understood that the opening ratio of 1.3 or more is specifically effective for the convex-shaped plasmon generator when Au is used as the material for the plasmon generator and when the temperature increase of the element is 200° C. Under the above-described conditions, it is useful to set the value as "effective opening ratio δef." However, not only the opening ratio of 1.3 or greater is specifically effective; but also it can be understood that the values of the opening ratio and "the effective opening ratio δef" are not substantially affected by the form of the plasmon generator when Au is used as the material for the plasmon generator and when the temperature increase of the element is 200° C.

Based on the above-described results and using the conditions as a basis that Au is used as the material for the plasmon generator and the temperature increase of the element is 200° C., an expression for the effective opening ratio δef, which was modified so as to apply universally even when the material for the plasmon generator and the temperature increase of the element have been changed, was set as follows.

Namely, the effective opening ratio δef is defined from a following expression:

$$\delta ef=1.3\times[(1+\text{linear expansion ratio of material } M\times\text{element increased temperature } Tup)^3-1]/[(1+\text{linear expansion ratio of Au}\times200)^3-1].$$

For example, when Au is used as the material for the plasmon generator and when the temperature increase of the element is 200° C. as described above, the effective opening ratio δef is 1.3 and it is preferred to dispose a portion where a cross-sectional area gradually decreases so as to obtain the opening ratio δo of 1.3 or greater.

Also, when Cu is used as the material for the plasmon generator and when the temperature increase of the element is 200° C., the effective opening ratio δef is approximately 1.6 and it is preferred to dispose a portion where a cross-sectional area gradually decreases so as to obtain the opening ratio δo of 1.6 or greater.

Also, when Ag is used as the material for the plasmon generator and when the temperature increase of the element is 200° C., the effective opening ratio δef is approximately 1.8 and it is preferred to dispose a portion where a cross-sectional area gradually decreases so as to obtain the opening ratio δo of 1.8 or greater.

In the above-described embodiment, a so-called trailing side arrangement that the plasmon generator is arranged above the pole 36 (on the +Z side) with respect to the pole 36 in the vicinity of the air bearing surface 12a is used as an example. However, not limited to this structure, a so-called leading side arrangement that the plasmon generator 42 is arranged below the pole 36 (on the -Z side) with respect to the pole 36 as illustrated in FIG. 9, for example, is also applicable.

Figure 9:
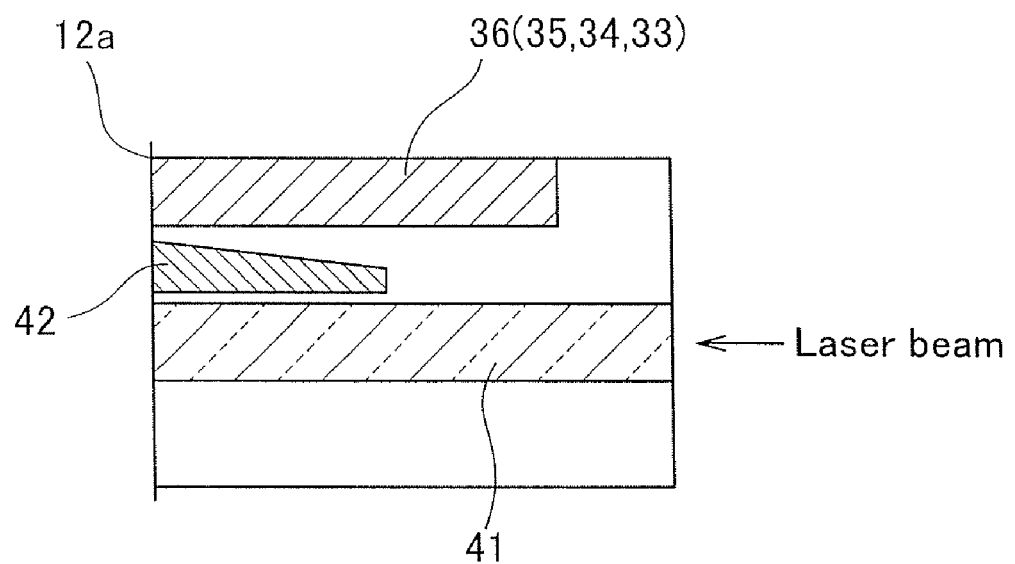
FIG. 9 is a cross-sectional view simply and schematically illustrating one example of a main part of another thermally-assisted magnetic recording head of the present invention.
Figure 10:
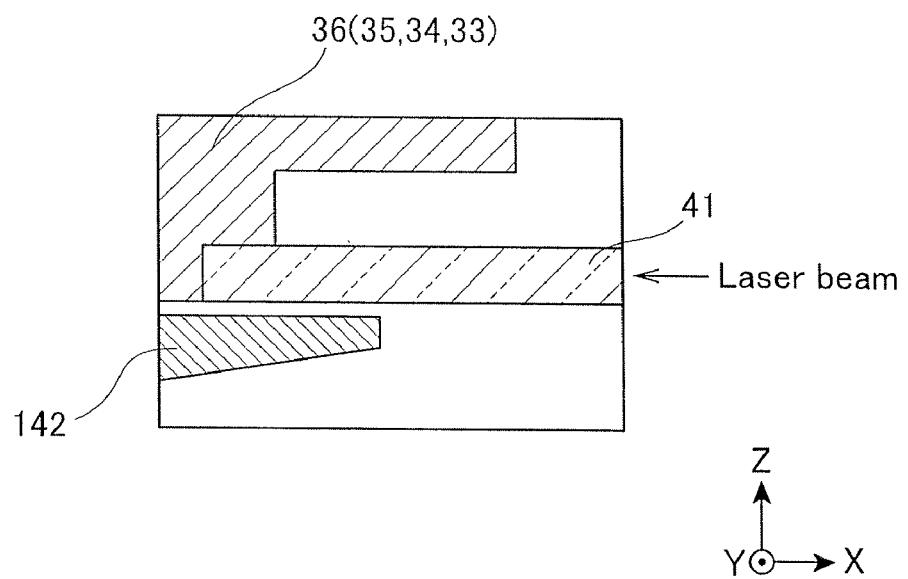
FIG. 10 is a cross-sectional view simply and schematically illustrating one example of a main part of another thermally-assisted magnetic recording head of the present invention.
Figure 11:
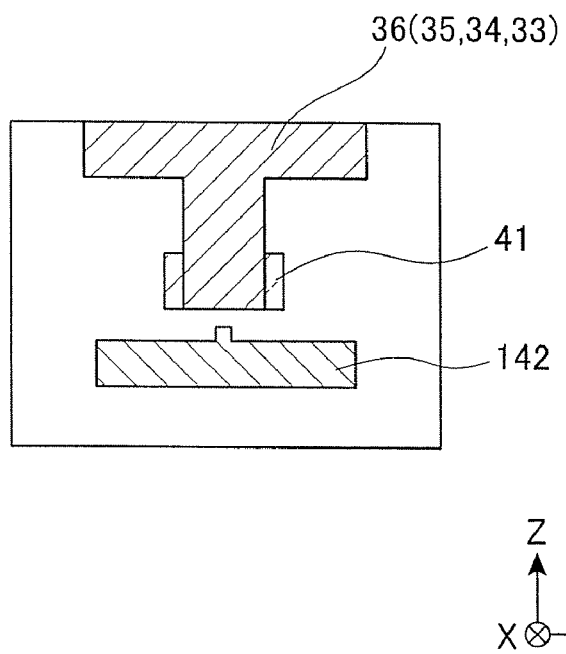
FIG. 11 is a front view simply and schematically illustrating the example of the main part of the thermally-assisted magnetic recording head of the present invention illustrated in FIG. 10.

In the embodiment illustrated in FIG. 9, the core 41 (waveguide 41) is arranged further under the plasmon generator 42 (on the -Z side). However, as illustrated in FIG. 10 and FIG. 11, the plasmon generator 142 may be arranged under the pole 36 (on the -Z side) with respect to the pole 36 (the leading side arrangement), and the core 41 (waveguide 41) may be arranged on the rear side of the pole 36 and on the trailing side of the plasmon generator 142.

Furthermore, FIG. 12A-FIG. 12D are views from the perspective of the ABS that is the air bearing surface. As illustrated in these figures, various kinds of the form of the plasmon generator and the arrangement of the plasmon generator and the core 41 (waveguide 41) are applicable.

Figure 12:
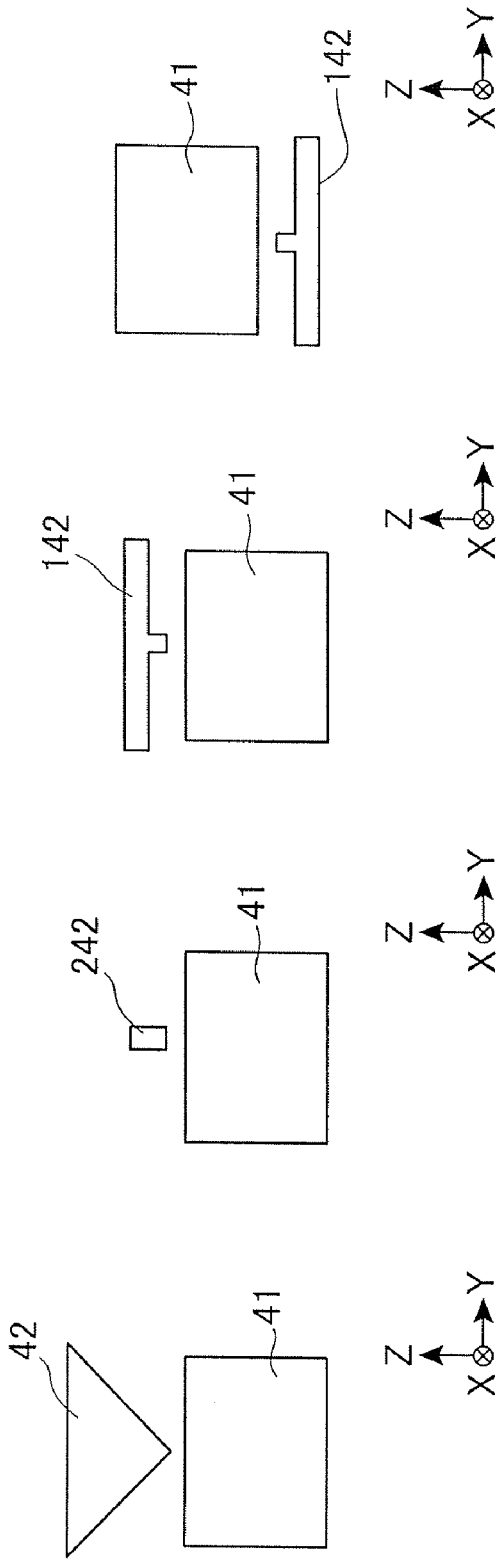
FIG. 12A, FIG. 12B, FIG. 12C and FIG. 12D are front views respectively illustrating arrangement relations between waveguides and plasmon generators from a perspective of an ABS, which is an air bearing surface.

For example, FIG. 12A is a drawing similar to FIG. 6 and illustrates a configuration example that the plasmon generator 42 is arranged on the trailing side with respect to the core 41 (waveguide 41). FIG. 12B illustrates a configuration example that a plasmon generator 242, which is a quadrangular prism shaped small piece, is arranged on the trailing side with respect to the core 41 (waveguide 41). FIG. 12C is a drawing similar to FIG. 8 and illustrates a configuration example that the plasmon generator is arranged on the trailing side with respect to the core 41 (waveguide 41). FIG. 12D illustrates a configuration example that is an inverse arrangement of the configuration illustrated in FIG. 12C with respect to the Z direction and that the plasmon generator 142 is arranged on the leading side with respect to the core 41 (waveguide 41). Additionally, the present invention is not limited to the configurations illustrated in FIG. 12A-FIG. 12D; but, various configurations are applicable.

As illustrated above in detail, the thermally-assisted magnetic recording head of the present invention includes a pole that generates a writing magnetic field from an end surface forming a portion of an air bearing surface opposing a magnetic recording medium, a waveguide through which light propagates, and a plasmon generator that surface-evanescent-couples with the light propagating through the waveguide. The plasmon generator includes a transmit part for transmitting plasmon generated on a surface to the air bearing surface as being closely-aligned with the waveguide and generates near-field light from a near-field light generating end surface forming a portion of the air bearing surface. The plasmon generator is configured with a portion where a cross-sectional area gradually decreases as going toward a depth side from the air bearing surface when being observed from a cross section parallel to the air bearing surface. Thereby, the volume of the plasmon generator itself can be decreased and an exposed area of a front surface on the air bearing surface can be formed larger. Therefore, even when a thermal expansion in connection with the temperature increase occurs in the plasmon generator, a rate that the plasmon generator projects from a so-called ABS that is the air bearing surface, is suppressed to extremely low.

Therefore, a rate that the plasmon generator projected from the ABS collides with the magnetic recording medium decreases, and the occurrence of the problems that are the loss of the plasmon generator and the degradation of the flying stability can be suppressed.

In the present invention, the projection amount of the plasmon generator from the air bearing surface caused by the thermal expansion or the like can be suppressed. Thereby, chronological degradation of output can be suppressed and the thermally-assisted recording with long-term and high reliability can be obtained.

What is claimed is:

1. A thermally-assisted magnetic recording head, comprising:
    a pole that generates a writing magnetic field from an end surface forming a portion of an air bearing surface opposing a magnetic recording medium;
    a waveguide through which light propagates; and
    a plasmon generator that surface-evanescent-couples with the light propagating through the waveguide, wherein
    the plasmon generator includes a transmit part for transmitting plasmon generated on a surface to the air bearing surface as being closely-aligned with the waveguide and generates near-field light from a near-field light generating end surface forming a portion of the air bearing surface, and the plasmon generator includes a portion where a cross-sectional area gradually decreases as going toward a depth side from the air bearing surface when being observed from a cross section parallel to the air bearing surface.

2. The thermally-assisted magnetic recording head according to claim 1, wherein
the plasmon generator is configured including Au, Ag or Cu.

3. The thermally-assisted magnetic recording head according to claim 1, wherein
the plasmon generator is configured with a propagation edge that functions as the transmit part or a convex part that functions as the transmit part.

4. The thermally-assisted magnetic recording head according to claim 1, wherein
the plasmon generator is configured with a tabular part and a convex part, the part projecting from the tabular part toward a side of the waveguide, that functions as the transmit part.

5. The thermally-assisted magnetic recording head according to claim 4, wherein
the tabular part has a portion where a cross-sectional area gradually decreases as going from the air bearing surface toward the depth side when being observed from a cross section parallel to the air bearing surface.

6. The thermally-assisted magnetic recording head according to claim 1, wherein,
when the plasmon generator is formed of a material M and is used in a state where a temperature increase thereof is Tup,
the portion where the cross-sectional area gradually decreases as going from the air bearing surface to the depth side is configured to obtain an opening ratio $\delta o$ that is an effective opening ratio $\delta ef$ or greater, which are defined by the following expressions;
the opening ratio $\delta o$ is defined as $\delta o$=(depth length Lb of plasmon generator×area $S_{ABS}$ of air bearing surface of plasmon generator)/(volume V of plasmon generator), and
the effective opening ratio $\delta ef$ is defined as $\delta ef=1.3\times[(1+$ linear expansion ratio of material M×element increased temperature Tup$)^3-1]/[(1+$linear expansion ratio of Au×200$)^3-1]$.

7. The thermally-assisted magnetic recording head according to claim 1, wherein
the transmit part is disposed continuously along a propagation direction of light from the near-field light generating end surface to the waveguide.

8. The thermally-assisted magnetic recording head according to claim 4, wherein
a projection height of the convex part is 20-30 nm.

9. The thermally-assisted magnetic recording head according to claim 1, wherein
a length of the plasmon generator along the propagation direction of light through the waveguide is 0.6-1.8 µm.

10. The thermally-assisted magnetic recording head according to claim 1, wherein
a width of the pole, from the perspective of the air bearing surface, in a direction substantially orthogonal to a moving direction of a magnetic recording medium is 0.2-0.3 µm.

11. A head gimbal assembly, comprising:
a thermally-assisted magnetic recording head according to claim 1; and
a suspension supporting the thermally-assisted magnetic recording head.

12. A magnetic recording device, comprising:
a magnetic recording medium;
the thermally-assisted magnetic recording head according to claim 1; and
a positioning device that positions the thermally-assisted magnetic recording head with respect to the magnetic recording medium as well as supports the thermally-assisted magnetic recording head.

* * * * *